Aug. 25, 1925.
A. C. STALEY
1,551,438
STEAM GENERATOR TEMPERATURE CONTROLLER
Filed Oct. 26, 1922    2 Sheets-Sheet 2
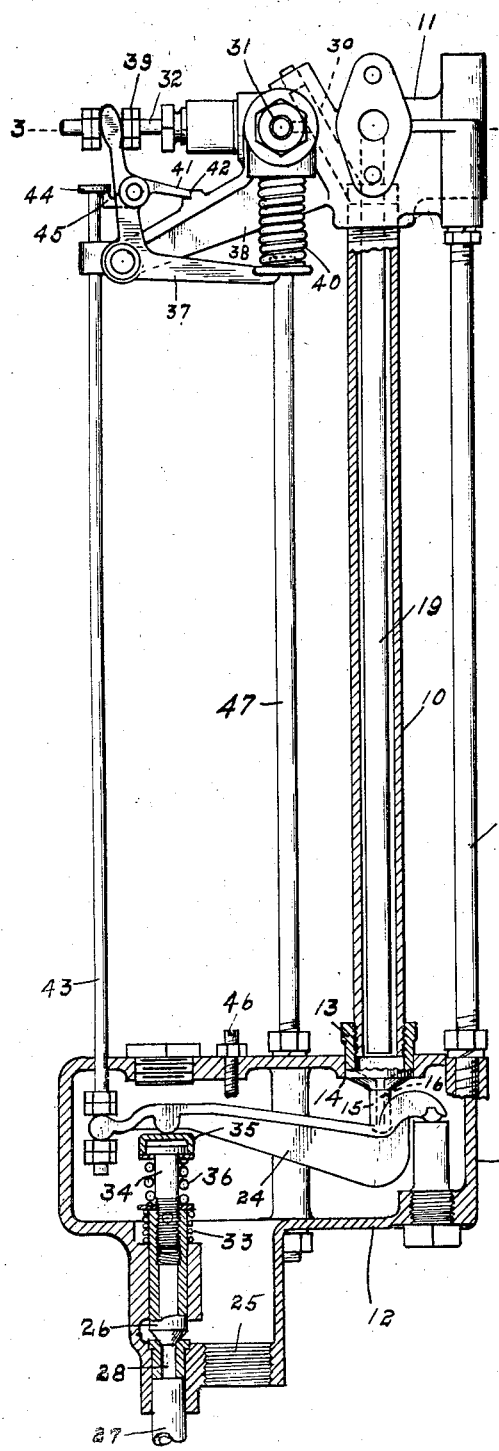
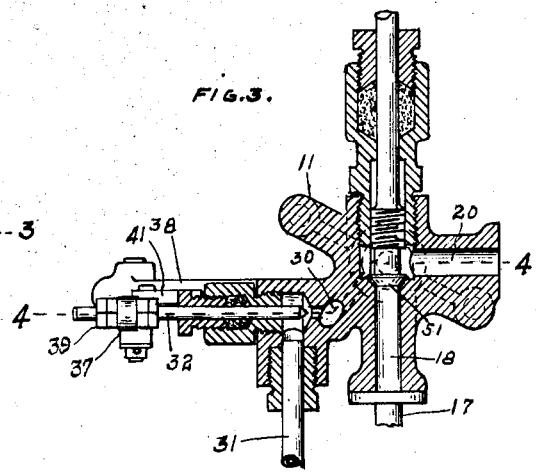
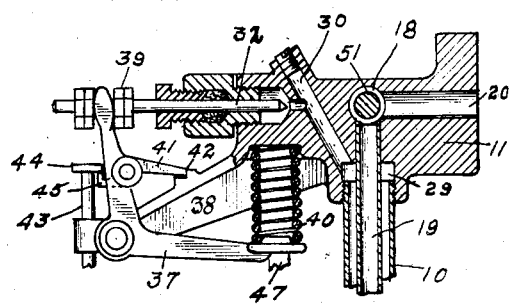
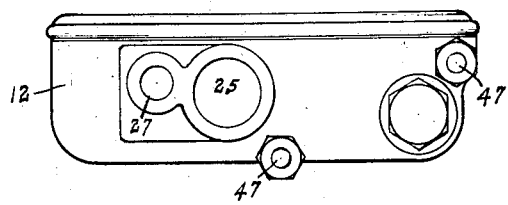
INVENTOR
ALLEN C. STALEY
BY *(signature)*
ATTORNEY Patented Aug. 25, 1925.

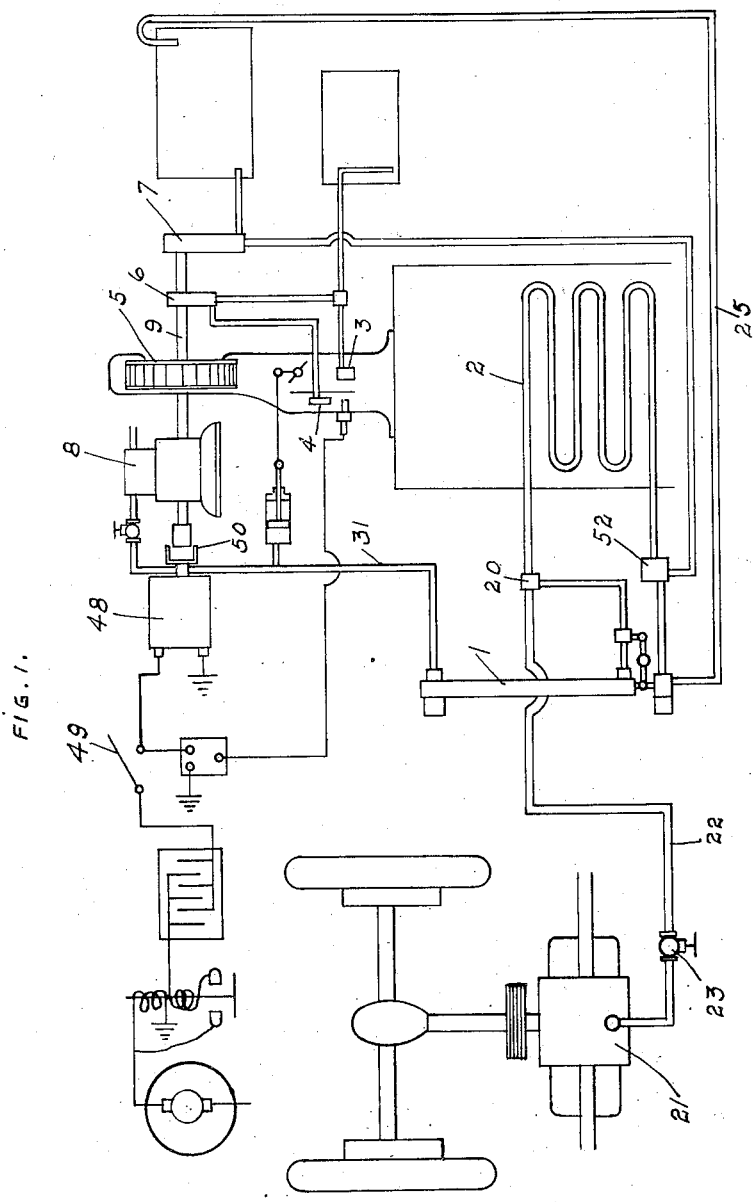

1,551,438

UNITED STATES PATENT OFFICE.

ALLEN C. STALEY, OF LA FAYETTE, INDIANA.

STEAM-GENERATOR TEMPERATURE CONTROLLER.

Application filed October 26, 1922. Serial No. 597,099.

*To all whom it may concern:*

Be it known that I, ALLEN C. STALEY, a citizen of the United States, residing at La Fayette, in the county of Tippecanoe and State of Indiana, have invented certain new and useful Improvements in Steam-Generator Temperature Controllers, of which the following is a specification.

This invention relates to a steam generator temperature controller and comprises a thermostatic mechanism, preferably for use in connection with an automotive steam power plant as set forth in a co-pending application filed August 30, 1922, Serial No. 585,271, and the prime feature of the present invention is the provision of means for automatically controlling the passage of water and steam from the source of supply to the various elements to which the thermostatic mechanism is attached.

A further feature of the invention is in so constructing the thermostat that steam for operating parts of the plant to which the thermostat is connected will pass directly through the thermostat.

A further feature of the invention is the provision of means in connection with the thermostat proper for automatically bleeding the thermostat at certain temperatures and for automatically closing the bleeding port when a higher temperature is reached.

A further feature of the invention is the provision of means for regulating the parts of the thermostatic mechanism for changing the time of operation of parts thereof.

And a further feature of the invention is the provision of means for automatically stopping the operation of the parts to which the thermostat is attached incident to a high degree of temperature therein.

Other objects and advantages will be hereinafter more fully set forth and pointed out in the accompanying specification.

In the accompanying drawings,

Figure 1 is a diagrammatic view of an automotive steam power plant applied to use, Figure 2 is a detail elevation partly in section of a thermostatic control for the operating parts of the power plant, Figure 3 is a detail sectional view thereof as seen on line 3—3, Figure 2, Figure 4 is a sectional view as seen on line 4—4, Figure 3, and Figure 5 is a bottom plan view of the thermostat.

The present thermostatic control 1 is used in connection with an automotive steam power plant, as shown diagrammatically in Figure 1, comprising a boiler construction 2, an aspirating fuel burner 3, a pilot 4, a blast fan 5, a fuel pump 6, a water pump 7, and an engine 8 for simultaneously operating the blast fan, fuel pump and water pump, all of said elements being operated from a single shaft 9. The thermostatic control 1 controls the passage of steam and water to the boiler construction 2 and to the engine 8. The thermostatic control 1 comprises a tubular member 10, one end of which is connected with a head 11, and the opposite end thereof with a hollow chamber 12, the end of the member 10 connecting with the chamber 12 having a cap 13 attached thereto, which cap has sliding contact with the walls of an opening 14 through the chamber 12, said cap having an extension 15 through which is formed a port 16 and by means of which water may escape from the tubular member 10 when it is necessary to drain or bleed said tube. The head portion 11 is connected with the discharge end of the boiler 2 by suitable piping 17, said head having a port 18 through which steam or water may pass into a central tube 19 encased within the tubular member 10 and live steam may also pass through the port 18 into a port 20 and from thence to the main engine 21 of the automobile, a pipe section 22 extending from the outer end of the port 20 to the engine 21, said pipe section having a valve 23 so that the engine 21 may be cut off from the boiler when desired. When the steam power plant is first started, the water in the coils of the boiler construction being cold and the tubular members 10 and 19 of the thermostatic control being contracted, the water forced by the pump 7 will be discharged partially into the tube 19 through the port 18, and as the lower end of the extension 15 is positioned a distance from the bleeder valve 24 the water discharged into the tube 19 will be bled or drawn off through the opening 16 and discharged into the hollow chamber 12 from whence it is returned through a drain 25 to the source of water supply, and by carrying off the cold water in this manner it is prevented from reaching the engine 8 employed for operating the fuel and water pumps and the blast fan or blower.

As the tubes of the boiler construction are at this time full of water it is necessary to provide means for carrying the residue of water forced by the water pump, back to the source of supply without discharging the same into the boiler and to this end a pressure operated valve 26 is mounted within the hollow chamber 12 and connected to the water pump 7 through the medium of a pipe 27, and as the valve 26 is open until such time as the water within the boiler has been heated to a prescribed degree, the water from the pump will pass through the valve seat 28 and discharge into the drain 25 from whence it will return to the source of supply of water. In this manner the water thrown by the pump 7 incident to raising the temperature of the water to a prescribed degree, will be shunted around the boiler and caused to circulate through the various elements of the thermostatic control and return to the source of supply without affecting the contents of the boiler.

After the water in the upper portion of the boiler construction has been converted into steam sufficiently to heat and expand the tubular member 10, the extension 15 will be forced against the bleeder valve 24 thereby closing the opening 16 and causing the steam to return through the tubular member 10 into a chamber 29 at the end of the tube 10 entering the head 11 from whence it is conveyed through a bore 30 into a pipe 31, said pipe extending from the head 11 to the engine 8, the steam carried through said pipe 31 operating said engine. The passage of the steam from the bore 30 into the pipe 31 is controlled through the medium of a valve 32, said valve being automatically operated in a manner to be hereinafter set forth.

One end of the bleeder valve 24 is fulcrumed within the chamber 12 while the opposite end thereof extends over and operates the pressure valve 26 and incident to the expansion of the tubular member 10 that portion of the bleeder valve extending over the pressure valve will be forced against the pressure valve with sufficient force to close the same, thereby cutting off the passage of the water through the pipe 27 into the drain and causing it to enter directly into the boiler construction. The valve 26 is normally unseated and held in unseated position, as when the pressure of the bleeder valve is removed therefrom, by a coil spring 33, the valve 26 having a stem 34 adjustably attached thereto so as to regulate the throw of the valve 26 to cause the same to close at the proper time. To guard against injury to the valve 26 incident to the closing of the same against its seat 28, a cup-shaped bearing plate 35 is positioned over the outer end of the stem 34 and so arranged that it will have sliding movement on the stem, a coil spring 36 of relatively heavier material than the spring 33 being arranged to hold the bearing plate 35 normally extended, but which will yield under continued pressure after the valve 26 has been seated thereby avoiding injury to the valve. The bleeder valve 24 under all normal conditions will merely serve to close the valve 26, but in the event of an excessive degree of heat thereby abnormally expanding the tubular member 10, the pressure on the valve will overcome the pressure of the spring 36 after the valve 26 has been seated and this additional movement is employed for automatically closing the valve 32 thereby shutting off the steam to the engine 8 and stopping the operation of all parts of the power plant and incident to this action the operator of the vehicle will thus be apprised that some abnormal condition has arisen requiring his immediate investigation. The valve 32 is held in open position through the medium of a bell crank lever 37 which is pivoted to a bracket 38 extending from the head 11, one arm of the bell crank lever being extended between adjusting nuts 39 threaded onto the stem of the valve 32, said nuts being positioned on opposite sides of the arm of the bell crank lever so that the valve will be influenced by the swinging movement of said arm. Between the end of the opposite arm of the bell crank 37 and a part of the head 11 is positioned a spring 40 which directs outward pressure against the co-operating arm of the lever so that when the lever is free to move, the tension of the spring will rock the bell crank lever on its pivot and force the valve 32 to closed position. The bell crank lever is designed to normally hold the valve 32 in open position, a latch 41 being pivoted to one arm of the bell crank lever and having its end abutting against a shoulder 42 on the bracket 38 and so long as said latch is in engagement with said shoulder, the valve 32 will be held in its open position. The free end of the bleeder valve 24 is adjustably attached to one end of a trip rod 43, the opposite end of said trip rod having a head 44 thereon which under abnormal lengthwise movement of the rod 43 will engage an extension 45 of the latch 41 and cause said latch to swing out of engagement with the shoulder 42, and when so released the spring 40 will instantly operate the bell crank lever to move the valve 32 to closed position and thereby cut off the steam to the engine 8. The head 44 is so arranged that under ordinary movement of the bleeder valve 24 it will not release the latch 41 from its co-operating shoulder and will only be brought into engagement with the extension 45 of the latch under extreme movement of the bleeder valve 24 against the pressure operated valve 26. To insure a sufficient clearance between the extension 15 and the bleeder valve 24, as when parts of the thermostat are cold, a stop 46 is adjustably mounted through one wall of the hollow chamber 12 against which the bleeder valve strikes as it is moving away from the pressure operated valve 26 thereby limiting the swinging movement of the bleeder valve.

The head 11 and the hollow chamber 12 are connected together by means of tie rods 47 which are adjustably connected with the head and chamber so that said parts may be adjusted towards or from each other to regulate the degree of expansion required of the tubular member 10 in order to operate the bleeder valve 24, consequently the thermostat may be readily regulated to require a greater or less degree of heat to properly set up operation thereof.

In operating a device of this class, when the boiler construction is cold, an electric motor 48 is energized by closing a switch 49, the clutch 50 on the motor engaging the shaft 9 and setting up operation of the blast fan 5, fuel pump 6, and water pump 7, this operation continuing until such time as a sufficient amount of steam is generated in the boiler to operate the engine 8 when the switch 49 is again opened and the motor 48 cut out from the engine. Prior to energizing the motor 48, a valve 51 employed for normally closing the port 18 is opened, consequently the water forced through the pipe 17 from the pump 7 will pass by the check valve 52 at the entrance of the boiler construction and enter the port 18 from whence it passes downwardly through the central tube 19 and through the opening 16 in the extension 15 and is returned to the source of supply of water through the drain 25.

As the entire volume of water thrown by the pump 7 will not pass through the port 18 and tube 19, the residue enters the chamber 12 through the pipe 27 and from thence into the drain, the flow of the water continuing through the tube 19 and pipe 27 until such time as sufficient steam is generated to operate the engine 8 and incident to raising the steam, the tubular member 10 will be sufficiently heated to expand the same and as the cap 13 attached to one end thereof is slidably mounted through the wall of the chamber 12, such expansion will force the end of the extension 15 against the bleeder valve 24 and stop further flow of the water and steam through the port 16. As the expansion of the tubular member continues as the temperature of the steam is increased, the bleeder valve 24 will be swung towards the pressure valve 26 and eventually close said valve whereupon the pressure of the water created by the pump 7 will force the water by the check 52 and enter the water into the boiler.

Should the temperature within the boiler recede, the tube 10 will be correspondingly cooled, thus gradually retracting the length of the tube and incident to this movement the spring 33 will gradually move the valve 26 away from its seat 28 and permit a certain amount of water created by the pump 7 to shunt around the boiler construction and return to the initial point of supply of the water thereby affording a better and quicker recuperation of steam within the boiler construction.

After the power plant has been once set in operation the thermostatic construction here shown will automatically control the various elements of the plant and maintain a substantially uniform temperature of the water at all times, and in the event of parts of the device becoming inoperative to such an extent as to cause the temperature of the steam to rise to a more or less dangerous degree the steam to the engine for operating the various elements of the plant will be instantly cut off thereby stopping operation of all parts of the device.

It will further be seen that a constant flow of live steam will be passing through the tubular members 10 and 19 so long as the mechanisms of the plant are in operation, consequently a more uniform operation of the regulating device will be maintained.

Having thus fully described my said invention, what I claim as new and desire to secure by Letters Patent, is:

1. A steam generator temperature controller, comprising a hollow chamber, a head having ports therethrough, expansible tubular members connecting said chamber and head, and means controlled by the expansion or contraction of one of said tubular members for regulating the flow of steam and water through said member and chamber.

2. In a steam generator temperature controller, a hollow chamber, a head having ports therethrough for the passage of steam, tubular members connecting said head and hollow chamber, a valve for cutting off the passage of steam through one of the ports of the head, a valve for controlling the admission and passage of water through the hollow chamber, means associated with said last valve for automatically releasing the first valve, and means for automatically closing said first valve when released.

3. In a steam generator temperature controller, a hollow chamber, a head having ports therethrough, expansible tubular members extending from said head to said hollow chamber, means for draining the contents from said tubes, and means within the hollow chamber for closing one end of one of said tubes incident to expansion of the tube.

4. In a steam generator temperature controller, a hollow chamber, a head having ports therethrough, a pair of tubular members extending from the head to said hollow chamber, one within the other, a drainage member at the end of the outer tubular member associated with the hollow chamber, a valve for controlling the drainage from the tubular members, means controlled by said valve for regulating the passage of water through the hollow chamber, and means for adjustably connecting said hollow chamber and head.

5. In a steam generator temperature controller, the combination with a boiler construction and a pump for conveying water to said boiler construction, of a thermostat comprising a hollow chamber, expansible tubes connected with said chamber, and means associated with and controlled by the contraction and expansion of said tubular members for controlling the flow of the water from said pump to said boiler construction.

6. The combination with a steam automotive power plant including a boiler construction, a pump for conveying water to said boiler construction, and an engine for operating said pump, of a thermostatic control for regulating the operation of said engine comprising a hollow chamber, a head having ports therethrough for the passage of steam and water, expansible tubular members extending from said head to said hollow chamber, means for draining off the contents of said tubes when in liquid form, means controlled by the expansion of said tubes for closing the drainage opening associated therewith, a valve for controlling the passage of steam through said head into said engine, and means controlled by the expansion of said tubes for automatically closing said valve for cutting off the passage of steam to said engine.

7. The combination with a steam automotive power plant including a boiler construction, a pump for conveying water to said boiler construction, and an engine for providing continuous operation of said pump, of a thermostat control for shunting the residue of water around said boiler construction, comprising a hollow chamber, a head having ports therethrough, expansible tubular members connected to said head and entering said hollow chamber, a valve in said hollow chamber for controlling the passage of water from the pump through said chamber, and means influenced by the expansion of said tubes for controlling the operation of said valve.

8. A steam generator temperature controller comprising a hollow chamber, a head having ports therethrough, an expansible tubular member connecting the chamber and head, and means controlled by the expansion or contraction of said tubular member for regulating the flow of water through the tubular member, substantially as set forth.

9. A steam generator temperature controller for boilers comprising a hollow chamber, a valve within the chamber for regulating the supply of feed water to the boiler, a head having ports therethrough communicating with the boiler discharge, an expansible tubular member connecting the chamber and head, and means controlled by the expansion and contraction of said tubular member for operating said valve, substantially as set forth.

10. A steam generator temperature controller for boilers comprising a hollow chamber, a valve within the chamber for regulating the supply of feed water to the boiler, a head communicating with the boiler discharge, said head having ports therethrough, a valve for one of the ports normally held away from its seat, an expansible tubular member connecting the chamber and head, and means controlled by the expansion and contraction of said tubular member for operating both of said valves, substantially as set forth.

11. In a power plant having a boiler, a pump and a steam engine, a thermostat including an expansible tube through which steam passes from said boiler to said engine, a tube within said expansible tube and communicating therewith at one end, a passage through the wall of the first-named tube for draining the same, and means controlled by the expansion and contraction of said tube for opening and closing the passage, substantially as set forth.

12. In a power plant having a boiler, a main steam engine, an auxiliary steam engine, and a pump supplying water to the boiler, a thermostat including an expansible tube through which steam passes from the boiler to the auxiliary engine, a valve controlling a by-pass for the water supplied by the pump, and means actuated by the expansion and contraction of said tube for operating said valve, substantially as set forth.

13. In a power plant having a boiler, a main steam engine, an auxiliary steam engine and a pump supplying water to the boiler said pump being driven by the auxiliary engine, a thermostat including an expansible tube through which steam passes from the boiler to the auxiliary engine, a valve controlling a by-pass for the water supplied by the pump, a valve controlling the passage of steam to the auxiliary engine, and means actuated by the expansion and contraction of said tube for operating said valves, substantially as set forth.

14. In a power plant having a boiler, a main steam engine, an auxiliary steam engine and a pump driven by the auxiliary engine for supplying water to said boiler, a thermostat including an expansible tube providing a conduit for steam passing from the boiler to the auxiliary pump, a valve adapted to close said passage, and means operable on excessive expansion of said tube for causing the valve to close said passage, substantially as set forth.

15. In a power plant having a boiler, a main steam engine, an auxiliary steam engine and a pump driven by the auxiliary engine for supplying water to said boiler, a thermostat including an expansible tube forming a part of the steam conduit leading from the boiler to the auxiliary engine, a chamber at one end of said tube, a drainage passage leading through the wall of said tube into said chamber, a valve in said chamber providing a by-pass for water from the pump, and means in the chamber controlled by the expansion and contraction of said tube for closing the drainage passage and actuating the valve to close the by-pass, substantially as set forth.

16. In a power plant having a boiler, a main steam engine, an auxiliary steam engine and a pump driven by the auxiliary engine for supplying water to said boiler, a thermostat including an expansible tube providing a conduit for steam passing from the boiler to the auxiliary pump, a valve adapted to close said passage, a valve controlling the passage from the boiler to the auxiliary engine, and a lever in said chamber constructed and arranged to close in succession the drainage opening, the valve for the by-pass, and the valve for the steam passage as said tube expands, substantially as set forth.

17. A device as in claim 17, having lost motion connections between said lever and the by-pass valve, substantially as set forth.

18. In a power plant having a boiler, a main steam engine, an auxiliary steam engine and a pump supplying water to said boiler, a thermostat including an expansible tube through which steam passes from said boiler to said auxiliary engine, a lever actuated by said tube, a valve controlling the passage from said boiler to said auxiliary engine, a spring tending to close said valve, a trip to hold the valve in open position, and means connected to said lever for releasing said trip on excessive expansion of said tube, substantially as set forth.

In witness whereof, I have hereunto set my hand at Indianapolis, Indiana, this 20th day of October, A. D. nineteen hundred and twenty-two.

ALLEN C. STALEY.